United States Patent [19]

Lawson

[11] Patent Number: 5,057,333
[45] Date of Patent: Oct. 15, 1991

[54] METHOD FOR MAKING PET FOOD FLAVOR ENHANCER

[75] Inventor: Richard L. Lawson, Sanger, Calif.

[73] Assignee: Products Carousel, Incorporated, Fresno, Calif.

[21] Appl. No.: 600,467

[22] Filed: Oct. 19, 1990

[51] Int. Cl.⁵ .............................. A23K 1/00; A23P 1/00
[52] U.S. Cl. ..................................... 426/480; 426/518
[58] Field of Search ................ 426/518, 478, 479, 480

[56] References Cited

U.S. PATENT DOCUMENTS

| | | | |
|---|---|---|---|
| 1,670,812 | 5/1928 | Kipp, Jr. | 241/95 |
| 2,189,711 | 2/1940 | Eigenbrot | 241/91 |
| 2,207,903 | 7/1940 | Strause | 241/95 |
| 2,225,095 | 12/1940 | Beverly | 241/95 |
| 2,355,050 | 8/1944 | Borton | 241/91 |
| 2,950,870 | 8/1960 | Danyluke | 241/91 |
| 4,236,676 | 12/1980 | Bialski et al. | 241/95 |
| 4,252,280 | 2/1981 | Rymer | 241/91 |
| 4,593,614 | 6/1986 | Berge et al. | 426/480 |
| 4,880,642 | 11/1989 | Berends | 426/480 |

*Primary Examiner*—George Yeung
*Attorney, Agent, or Firm*—Townsend and Townsend

[57] ABSTRACT

A pet food flavor enhancer (46) is made from pieces of cleaned cattle hooves (10) by reducing the hoof pieces to a granular size (40) by tumbling the pieces of hooves within a rotary drum (62) having inwardly opening louvered openings (74) formed in the circumferential sidewall (66) of the drum. The louvered openings have sharpened cutting edges (76) so that the pieces of hooves are chipped as they strike the cutting edges. The chipped pieces of hooves are collected after passing through the louvered openings and are separated by size at a shaker table assembly (104). The shaker assembly separates the desirable granular hoof material product from larger hoof material (36) and smaller hoof material (42).

12 Claims, 3 Drawing Sheets

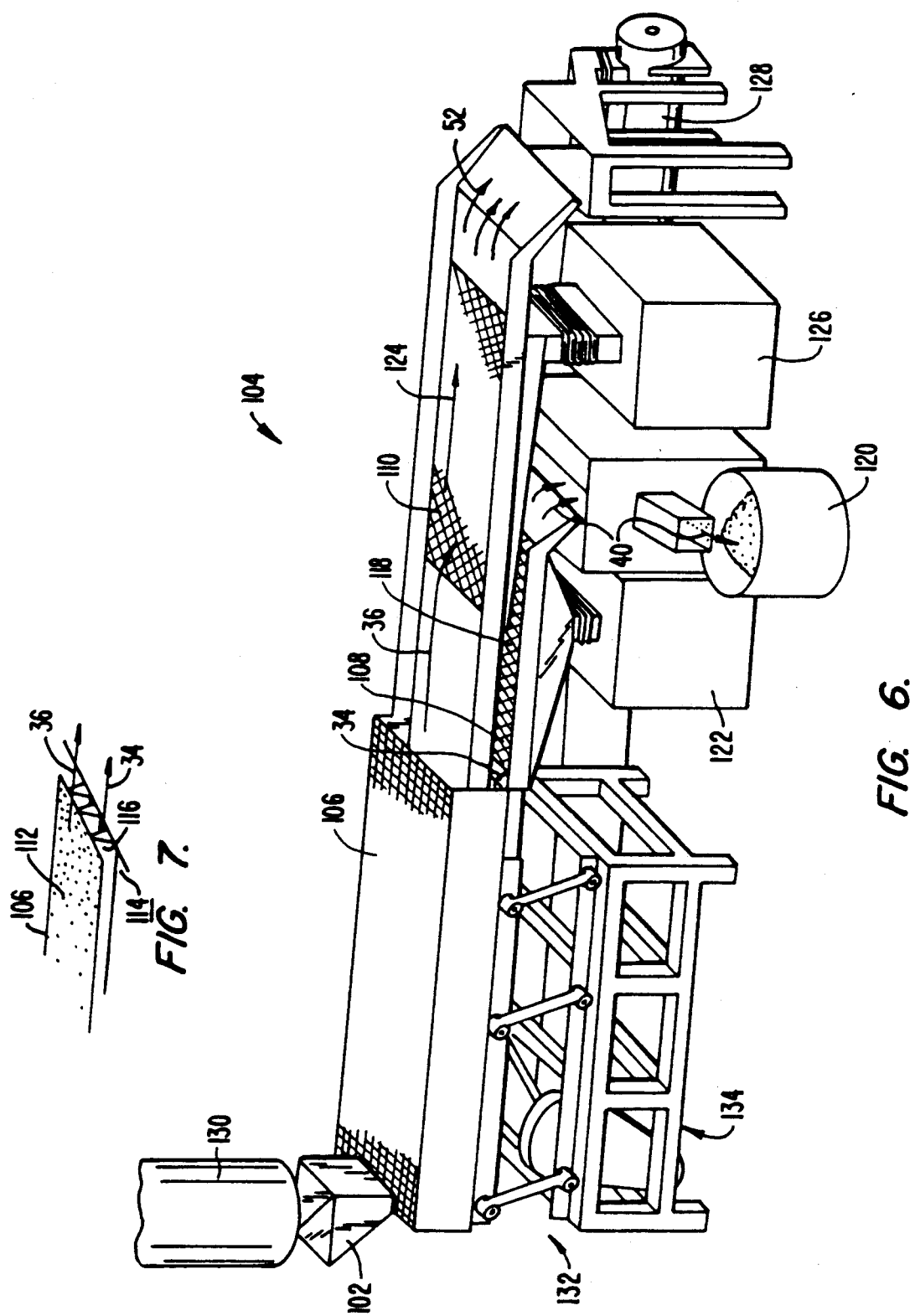

METHOD FOR MAKING PET FOOD FLAVOR ENHANCER

BACKGROUND OF THE INVENTION

Cleaned and sterilized cattle hooves have become a popular chew toy for dogs. During the processing of the hooves, the hooves are often trimmed for aesthetic and safety reasons. These left over trim pieces are not, however, suitable for use as dog chews. Therefore, the remaining pieces are often sold in bulk for further processing, such as to produce gelatin.

SUMMARY OF THE INVENTION

The present invention recognizes that the present uses for the pieces of hooves left over from processing cattle hooves to create dog chews are poor uses from an economical standpoint. The present invention permits an economically advantageous use of the trimmed pieces of cattle hooves by reducing the trimmed pieces to a granular hoof material for use as a flavor enhancer in pet food.

The pet food flavor enhancer is made from appropriately cleaned hooves, typically cattle hooves, by reducing the hooves to a granular hoof material. The method is preferably carried out by tumbling pieces of the hooves within a rotary drum having louvered openings formed in the circumferential sidewall of the drum. The inwardly opening louvered openings have sharpened cutting edges. The pieces of hooves fall against the cutting edges and are chipped by the cutting edges. The chipped pieces of hooves pass through the louvered openings and are passed to a shaker table assembly where they are separated by size.

The shaker assembly separates the desirable granular hoof material from larger hoof material and smaller hoof material, the smaller hoof material termed dust. Some of the dust is preferably mixed back with the granular hoof material so that the final product is about 15 percent dust and 85 percent granular hoof material by weight. The product is sold to be used on a pet's food as a flavor enhancer.

The larger hoof material can be used for other products or processed further, typically by pulverizing in a commercial hammermill. The pulverized material is then reintroduced to the shaker table assembly for separation of the granular hoof material from larger and smaller hoof material.

The primary advantage of the invention is that it permits the hoof pieces to be converted to an economically advantageous form by reducing the size of the pieces to a granular material. The granular material can then be sprinkled upon a pet's food or incorporated, by a manufacturer, into pet food.

Other features and advantages of the invention will appear from the following description in which the preferred embodiment has been set forth in detail in conjunction with the accompanying drawings.

BRIEF DESCRIPTION OF THE DRAWINGS

FIG. 6 is a simplified overall view of the shaker table assembly used with the method of FIG. 1; and FIG. 7 is an enlarged, simplified view of first sifter screen of the shaker table assembly of FIG. 6.

DETAILED DESCRIPTION OF THE PREFERRED EMBODIMENT

Figure 1:
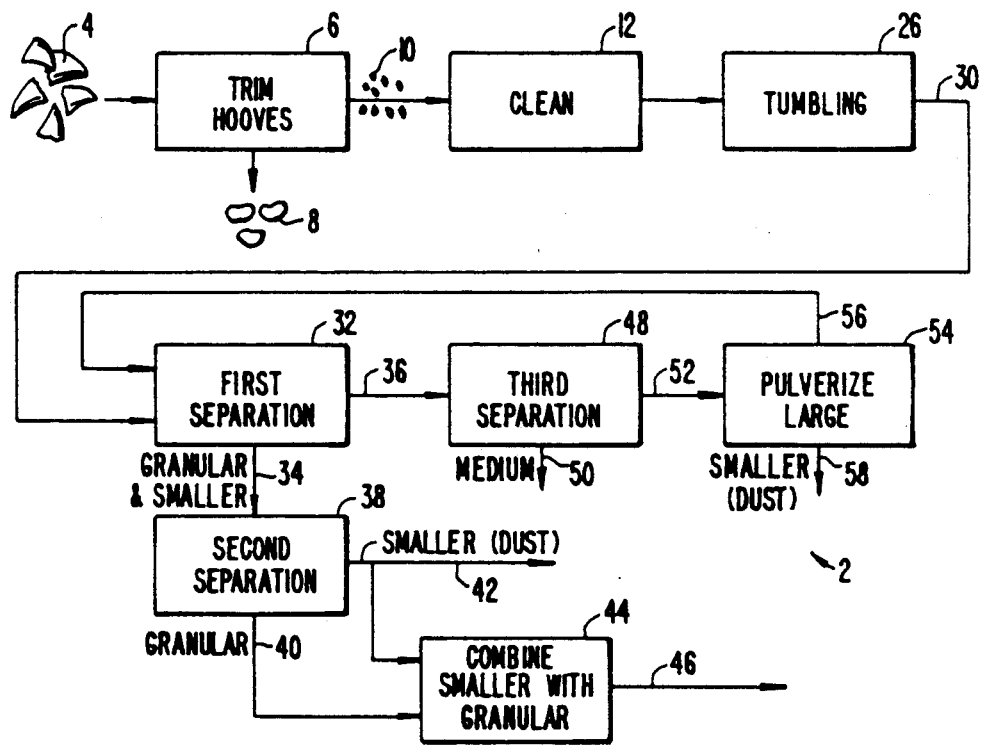
FIG. 1 is a flow diagram showing the steps for making a pet food flavor enhancer according the invention.

FIG. 1 illustrates, in a schematic flow chart form, a system or method 2 for making a pet food flavor enhancer. System 2 begins with cattle hooves 4 which are trimmed at trim station 6 to create trimmed hooves 8 and hoof trim pieces 10. Hoof trim pieces 10 are then cleaned at cleaning stage 12 in a manner similar to used to clean trimmed hooves 8. This trimming and hoof cleaning activity is described in U.S. Pat. Application Ser. No. 07/443,457 filed Nov. 29, 1989, for Dog Chew Processing Method, now U.S. Pat. No. 4,985,964, the disclosure of which is incorporated by reference.

Figure 2:
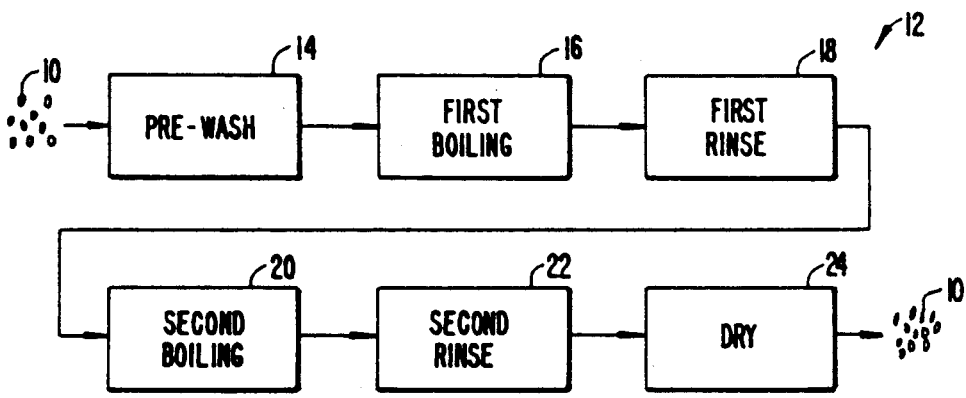
FIG. 2 is a flow diagram illustrating the steps taken to clean the hoof trim pieces of FIG. 1.

At cleaning stage 12, shown in more detail in FIG. 2, hoof trim pieces 10 are sent to a prewash step 14 where the hoof trim pieces are prewashed three times in water at 180° F. for 15 minutes duration each. Hoof trim pieces 10 are then passed through a first boiling step 16 at which the hooves are boiled in water for 15 minutes at 212° F. Next, pieces 10 are rinsed in cold water for 10 minutes at rinse step 18 and are then boiled in a solution of 100 parts water to 1 part peroxide for 10 minutes at 212° F. at second boiling step 20. Thereafter, hoof trim pieces 10 are rinsed for 15 minutes in water at 180° F. at second rinse step 22. Hoof trim pieces 10 are then dried in a hot chamber at 180° F. for 96 hours at dry step 24 to create washed and dried hoof trim pieces.

Figure 3:
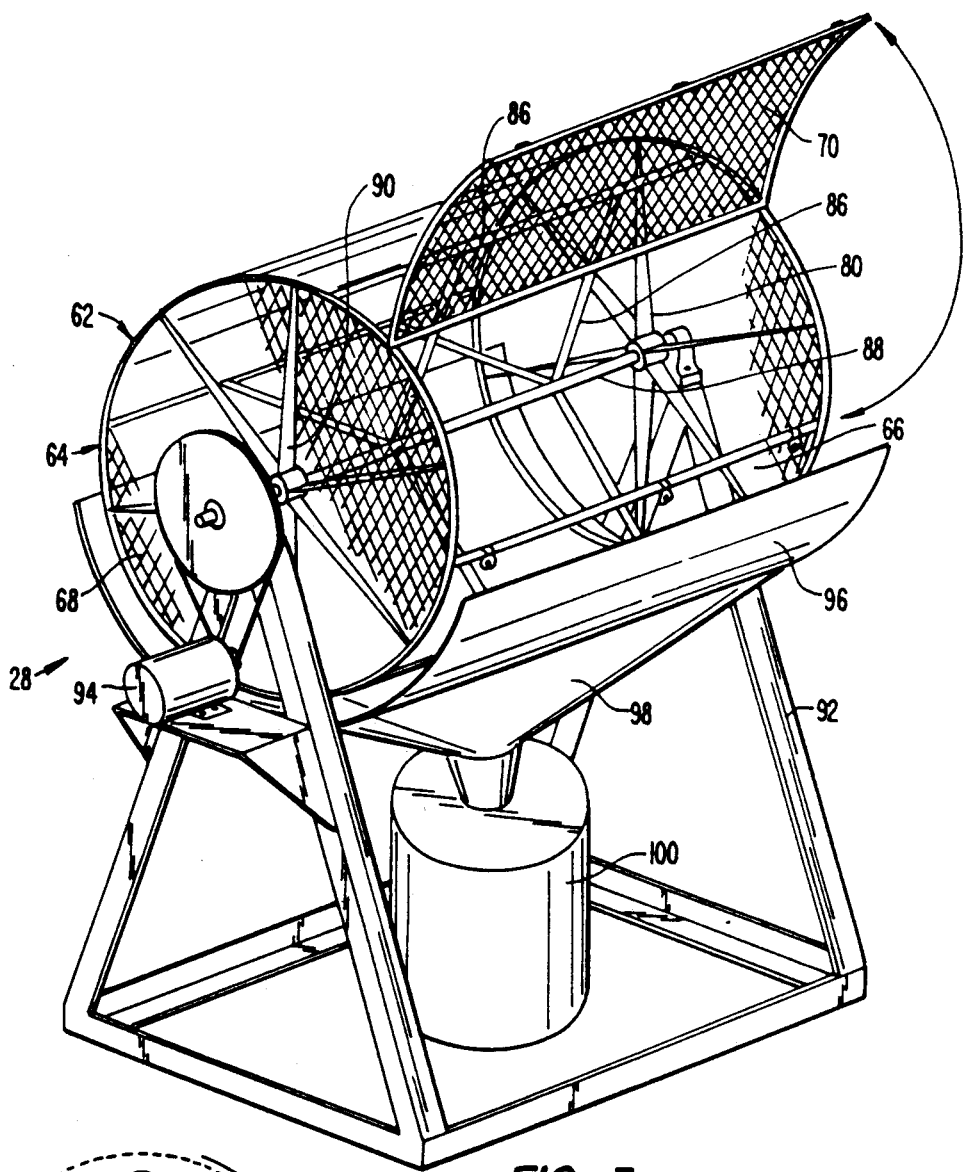
FIG. 3 is a simplified perspective view showing a tumbler used with the tumbling step of FIG. 1 with the chip plate removed for clarity.

Returning now to FIG. 1, pieces 10 are reduced in size at a tumbling step 26 using tumbler 28 shown in FIG. 3. The construction and operation of tumbler 28 will be described below. The purpose of tumbler 28 is to create chipped hoof material, in particular granular hoof material about the size of coarsely ground pepper. However, in creating the chipped hoof material, material larger and smaller from the desired granular material is also created. At first separation step 32, granular and smaller hoof material 34 is separated from larger hoof material 36. Granular and smaller hoof material 34 is then further separated at a second separation step 38 into granular hoof material 40 and smaller hoof material 42, also called dust because of its fine consistency. A portion of dust 42 is combined with granular hoof material 40 at combination step 44 to create a mixed size pet food flavor enhancer 46. Flavor enhancer 46 typically includes about 15 percent by weight of dust 42 in the preferred mixture.

Larger hoof material 36 is separated into medium hoof material 50 and large hoof material 52 at a third separation step 48. Large hoof material 52 is then pulverized at a pulverizing step 54 to create pulverized hoof material 56 and additional dust 58. The pulverized hoof material 56 is reintroduced into system 2 at first separation step 32. Pulverizing step 54 is preferably carried out using a hammermill model XLT 24313 in conjunction with an air vent system Model II air vent for collecting additional dust 58, both made by Jacobson Inc. of Minneapolis, Minn.

Although medium hoof material 50 could also be pulverized at pulverizing step 54, it is, in this preferred embodiment, separated from large hoof material 52 for other uses, such as making dog biscuits. Similarly, excess dust 42, 58 may be advantageously used as an addition to various pet foods.

Figure 4:
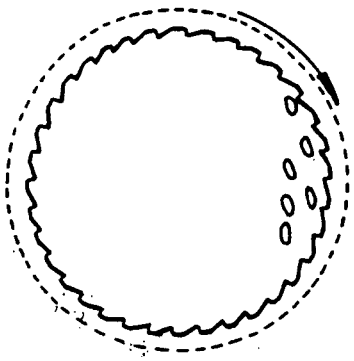
FIG. 4 is a simplified cross-sectional view of the drum of FIG. 3 illustrating the tumbling action of the hoof trim pieces and the cutting action of the sharpened leading edges of the chip plate on the inside of the drum.
Figure 5:
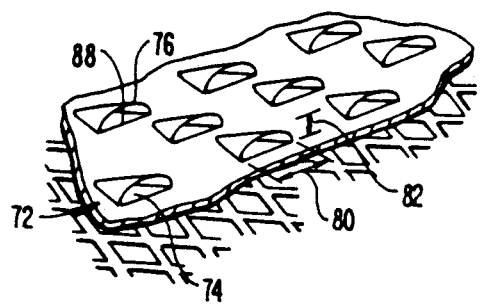
FIG. 5 is an enlarged illustration of the louvered chip plate and structural mesh used with the drum of FIG. 3.

Turning now to FIGS. 3-5, tumbler 28 will be described in more detail. Tumbler 28 includes a double-walled cylindrical drum 62 made of a rigid framework 64 covered at its cylindrical periphery 66 and circular ends 68 by diamond plate screen 70. Diamond plate screen 70 has a mesh size of about ¼ inch. Louvered chip plate 72 (not shown in FIG. 3 for clarity) is mounted on the inside of diamond plate screen 70 around substantially the entire periphery 66. Chip plate 72 has numerous louvered openings 74 created by sharpened leading edges 76 and base edges 88 of chip plate 72. Chip plate 72 is made of stainless steel about ¼ inch thick. Louvered openings 74 have widths 80 of about ¼ inch and heights 82 of about ¼ inch. Leading edges 76 are sharpened using a disc grinder.

Tumbler 28 includes two sets of agitators 86 which extend radially from a center shaft 88. End agitators 90 extend radially from center shaft 88 adjacent ends 68 of drum 62. Drum 62 is supported by a support frame 92 and is driven by a motor and pulley arrangement 94 at about 30 RPM. Tumbler 28 also includes a chip catcher 96 underlying drum 86 having a funnel section 98 which directs chipped hoof material 30 into a chip collector drum 100.

Chipped hoof material 30 from chip collector 100 is dumped into a material inlet 102 of a shaker table assembly 104, shown in FIG. 6, to begin first separation step 32. Shaker table assembly 104 includes first, second and third sifter screens 106, 108, 110 corresponding to first separation step 32, second separation step 38 and third separation step 48. First sifter screen 106, shown in more detail in FIG. 7, includes an 18×16 mesh surface 112 supported above a solid bottom surface 114 by angled supports 116. Granular and smaller hoof material 34 passes through mesh surface 112 and along surface 114 until reaching second sifting screen 108. Larger hoof material 36 is too large to pass through mesh surface 112 but continues on to third sifter screen 110. Second sifter screen 108 includes a 60-mesh surface 118 permits smaller material or dust 42 to pass through it while the granular hoof material 40 exits second sifting screen 108 to be collected at granular collector 120. To enhance the dust collection, dust collector 122 uses a fan to pull air, and dust 42 therewith, through 60 mesh screen 118. In this application, granular hoof material 40 means hoof material too large to pass through about a 60-mesh screen but small enough to pass through about an 18×16 mesh screen.

Third sifter screen 110 includes a 14×16 mesh surface 124 which separates medium hoof material 50 from large hoof material 52. Medium hoof material 50 is collected at a collector 126. Medium hoof material may be used for other purposes, such as in making dog biscuits. Large hoof material 52 is directed through the pulverizer at pulverizing step 54 through the use of a return auger 128.

Shaker table assembly 104 also includes a dust exhaust 130 which removes dust 52 which is released when chipped hoof material 30 is dumped into material inlet 102. First, second and third sifter screens 106, 108 and 110 are driven in a conventional manner using a belt-driven rocker arm assembly 132 mounted to a drive frame 134. Assembly 132 causes a sifter screens 106, 108, 110 to vibrate a total of ¼ inches at a rate of 416 cycles per minute.

Modification and variation can be made to the disclosed embodiment without departing from the subject of the invention as defined in the following claims. For example, chipped hoof material 30 could be transported from tumbler 28 to material inlet 102 in a continuous process rather than a batch process. Hooves 4 could be used instead of or in addition to hoof trim pieces 10 in tumbler 28.

What is claimed is:

1. A method for making a pet food flavor enhancer comprising the following steps:
   cleaning animal hooves;
   reducing the size of the hooves to include granular hoof material; and
   separating the granular hoof material from any other hoof material created during the reducing step for use as a pet food flavor enhancer.

2. The method of claim 1 further comprising the step of creating pieces of hooves from the animal hooves prior to the reducing step.

3. The method of claim 1 wherein the reducing step is carried out by:
   placing the hooves within a tumbler having an inside surface with louvered openings partially defined by inwardly extending cutting edges;
   rotating the tumbler so the hooves fall against the cutting edges to chip hoof material from the hooves, the chipped hoof material passing through the louvered openings; and
   collecting the chipped hoof material.

4. The method of claim 3 further comprising the step of recombining at least a portion of the smaller hoof material with the granular hoof material to create a mixed size pet food flavor enhancer.

5. The method of claim 1 further comprising the steps of:
   pulverizing at least a portion of the larger hoof material to create pulverized hoof material; and
   repeating the separating step with the pulverized hoof material.

6. The method of claim 3 wherein the separating step is carried out using a multi-stage shaker table assembly.

7. The method of claim 6 wherein the separating step includes the step of passing the granular and smaller hoof material over a sifter screen while drawing air through the sifter screen so to pull the smaller material through the sifter screen, the sifter screen being sized so at least a substantial portion of granular hoof material does not pass through the sifter screen with the smaller material.

8. A method for making a pet food flavor enhancer comprising the following steps:
   cleaning animal hooves;
   placing the hooves within a tumbler having an inside surface with louvered openings partially defined by inwardly extending cutting edges;
   rotating the tumbler so the hooves fall against the cutting edges to chip hoof material from the hooves, the chipped hoof material passing through the louvered openings; and
   collecting the chipped hoof material, the chipped hoof material including granular hoof material plus, hoof material larger and smaller than said granular hoof material;

separating the granular hoof material from said larger and smaller hoof material using a multi-stage shaker table assembly for use as a pet food flavor enhancer;

pulverizing at least a portion of the larger hoof material to create pulverized hoof material;

repeating the separating step with the pulverized hoof material; and recombining at least a portion of the smaller hoof material with the granular hoof material to create a mixed size pet food flavor enhancer.

9. The method of claim 1 wherein the reducing step is carried out to create hoof material that is smaller than the granular hoof material.

10. The method of claim 1 wherein the reducing step is carried out to create hoof material that is larger than the granular hoof material.

11. The method of claim 1 wherein the reducing step is carried out to create hoof material that is larger and smaller than the granular hoof material.

12. A method for making a pet food flavor enhancer comprising the following steps:

cleaning animal hooves;

reducing the size of the hooves to include granular hoof material; and collecting the granular hoof material for use as a pet food flavor enhancer.

* * * * *